(12) United States Patent
Cutter et al.

(10) Patent No.: US 11,868,538 B1
(45) Date of Patent: Jan. 9, 2024

(54) USING GESTURES TO CONTROL A MEDIA PLAYER

(71) Applicant: Roku, Inc., San Jose, CA (US)

(72) Inventors: Michael Cutter, San Jose, CA (US);
Sunil Ramesh, San Jose, CA (US);
Karina Levitian, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/973,150

(22) Filed: Oct. 25, 2022

(51) Int. Cl.
| | |
|---|---|
| G06F 3/00 | (2006.01) |
| G06V 10/764 | (2022.01) |
| G06V 40/20 | (2022.01) |
| G06V 20/52 | (2022.01) |
| G06T 7/70 | (2017.01) |
| H04N 23/90 | (2023.01) |
| G06F 3/01 | (2006.01) |

(52) U.S. Cl.
CPC ............ G06F 3/017 (2013.01); G06T 7/70 (2017.01); G06V 10/764 (2022.01); G06V 20/52 (2022.01); G06V 40/20 (2022.01); H04N 23/90 (2023.01); G06T 2207/30196 (2013.01); G06T 2207/30232 (2013.01); G06T 2207/30244 (2013.01)

(58) Field of Classification Search
CPC . G06F 3/017; G06T 7/70; G06T 2207/30196; G06T 2207/30232; G06T 2207/30244; G06V 10/764; G06V 20/52; G06V 40/20; H04N 23/90
See application file for complete search history.

(56) References Cited

U.S. PATENT DOCUMENTS

| | | | | |
|---|---|---|---|---|
| 2016/0318524 A1* | 11/2016 | Ricci | ................ | G08G 1/01 |
| 2018/0081447 A1* | 3/2018 | Gummadi | ............... | G06F 3/167 |
| 2019/0302895 A1* | 10/2019 | Jiang | ................ | G06F 3/016 |
| 2020/0241651 A1* | 7/2020 | Holz | ................ | G06F 3/017 |
| 2022/0405946 A1* | 12/2022 | Ruan | ................ | G06T 7/251 |

OTHER PUBLICATIONS

Sampath et al., "Controlling media player using hand gestures with VLC media player", World Journal of Advanced Research and Reviews, 2022, 14(03), 466-472.
Moon et al., "InterHand2.6M: A Dataset and Baseline for 3D Interacting Hand Pose Estimation from a Single RGB Image", Aug. 21, 2020, 29 pages.

* cited by examiner

*Primary Examiner* — Abhishek Sarma
(74) *Attorney, Agent, or Firm* — McDonnell Boehnen Hulbert & Berghoff LLP

(57) ABSTRACT

In one aspect, an example method includes (i) receiving, by a computing system and from an input device associated with the computing system, a command to map a customized gesture with a particular action of a plurality of actions that a media player is configured to perform; (ii) in response to receiving the command, monitoring, by the computing system and using a camera, a viewing environment of the media player to detect performance by a person of the customized gesture; and (iii) in response to detecting performance of the customized gesture: generating, by the computing system, a classification for use by the computing system for detecting the customized gesture, and storing, by the computing system, in memory, mapping data that correlates the detected customized gesture with the particular action.

17 Claims, 6 Drawing Sheets

USING GESTURES TO CONTROL A MEDIA PLAYER

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example computing system is described. The computing system is configured for performing a set of acts including (i) receiving, from an input device associated with the computing system, a command to map a customized gesture with a particular action of a plurality of actions that a media player is configured to perform; (ii) in response to receiving the command, monitoring, using a camera, a viewing environment of the media player to detect performance by a person of the customized gesture; and (iii) in response to detecting performance of the customized gesture: generating a classification for use by the computing system for detecting the customized gesture, and storing, in memory, mapping data that correlates the detected customized gesture with the particular action.

In another aspect, an example method is described. The method includes (i) receiving, by a computing system and from an input device associated with the computing system, a command to map a customized gesture with a particular action of a plurality of actions that a media player is configured to perform; (ii) in response to receiving the command, monitoring, by the computing system and using a camera, a viewing environment of the media player to detect performance by a person of the customized gesture; and (iii) in response to detecting performance of the customized gesture: generating, by the computing system, a classification for use by the computing system for detecting the customized gesture, and storing, by the computing system, in memory, mapping data that correlates the detected customized gesture with the particular action.

In another aspect, a non-transitory computer-readable medium is described. The non-transitory computer-readable medium has stored thereon program instructions that upon execution by a computing system, cause performance of a set of acts. The set of acts include (i) receiving, from an input device associated with the computing system, a command to map a customized gesture with a particular action of a plurality of actions that a media player is configured to perform; (ii) in response to receiving the command, monitoring, using a camera, a viewing environment of the media player to detect performance by a person of the customized gesture; and (iii) in response to detecting performance of the customized gesture: generating a classification for use by the computing system for detecting the customized gesture, and storing, in memory, mapping data that correlates the detected customized gesture with the particular action.

DETAILED DESCRIPTION

I. Overview

Modern computing devices, such as media systems in the homes or other premises of end-users, are increasingly equipped with functions aimed to improve user experience. These media systems may range from smart televisions to set-top boxes to video game consoles. In some cases, computing devices implement hands-free technologies such as virtual assistants and gesture recognition to improve user experience. However, further improvements are desired in gesture recognition technology in order to further improve user experience.

Disclosed herein are various methods and systems for using gestures to control a media player. In an example method, a computing system facilitates the creation of customized gestures and mapping to corresponding actions performed by the media system by receiving, from an input device associated with the computing system, a command to map a customized gesture with a particular action of a plurality of actions that a media player is configured to perform. In response to receiving the command, the computing system monitors, using a camera, a viewing environment of the media player to detect performance by a person of the customized gesture. And in response to detecting performance of the customized gesture, the computing system generates a classification for use by the computing system for detecting the customized gesture, and stores, in memory, mapping data that correlates the detected customized gesture with the particular action.

In another example method disclosed herein, the computing system identifies which of a plurality of persons in the viewing environment to monitor to detect gestures. For instance, a person that performs a particular wake gesture or other type of gesture will subsequently be monitored by the computing system for gesture recognition.

In yet another example method, the computing system uses images captured by a camera in the viewing environment to train itself to be able to recognize gestures in images captured by cameras outside of the viewing environment. As such, a person can control the media player without being physically present in the viewing environment. For instance, a person can perform a wake gesture to a camera outside of their house to turn on the media player before they enter the house.

Various other features of these systems and methods are described hereinafter with reference to the accompanying figures.

II. Example Architecture

Figure 1:
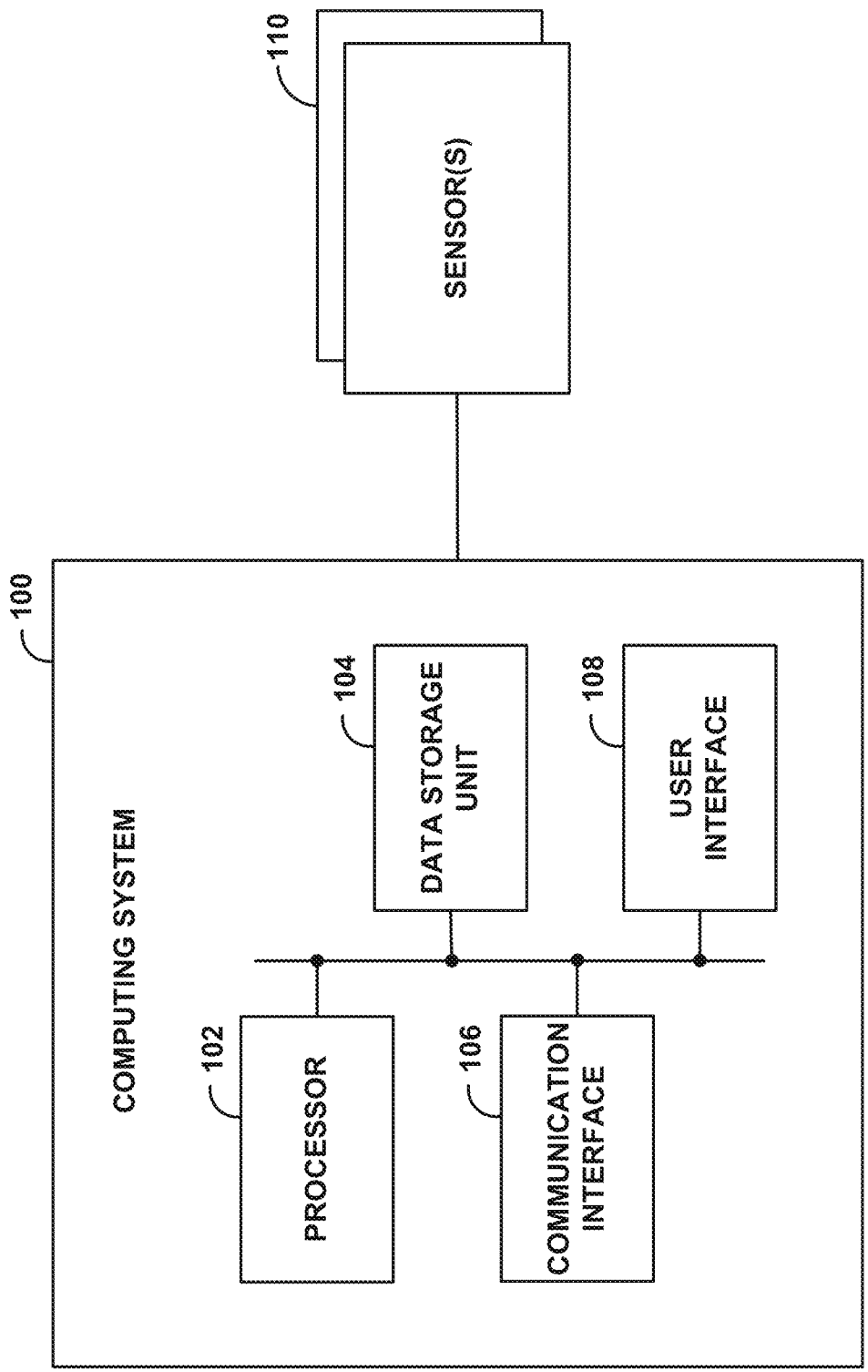
FIG. 1 is a simplified block diagram of an example computing system in which various described principles can be implemented.

FIG. 1 is a simplified block diagram of an example computing system 100. The computing system 100 can be configured to perform and/or can perform one or more operations, such as the operations described in this disclosure. The computing system 100 can include various components, such as a processor 102, a data-storage unit 104, a communication interface 106, and/or a user interface 108.

The processor 102 can be or include a general-purpose processor (e.g., a microprocessor) and/or a special-purpose processor (e.g., a digital signal processor). The processor 102 can execute program instructions included in the data-storage unit 104 as described below.

The data-storage unit 104 can be or include one or more volatile, non-volatile, removable, and/or non-removable storage components, such as magnetic, optical, and/or flash storage, and/or can be integrated in whole or in part with the processor 102. Further, the data-storage unit 104 can be or include a non-transitory computer-readable storage medium, having stored thereon program instructions (e.g., compiled or non-compiled program logic and/or machine code) that, upon execution by the processor 102, cause the computing system 100 and/or another computing system to perform one or more operations, such as the operations described in this disclosure. These program instructions can define, and/or be part of, a discrete software application.

In some instances, the computing system 100 can execute program instructions in response to receiving an input, such as an input received via the communication interface 106 and/or the user interface 108. The data-storage unit 104 can also store other data, such as any of the data described in this disclosure.

The communication interface 106 can allow the computing system 100 to connect with and/or communicate with another entity according to one or more protocols. Therefore, the computing system 100 can transmit data to, and/or receive data from, one or more other entities according to one or more protocols. In one example, the communication interface 106 can be or include a wired interface, such as an Ethernet interface or a High-Definition Multimedia Interface (HDMI). In another example, the communication interface 106 can be or include a wireless interface, such as a cellular or WI-FI interface.

The user interface 108 can allow for interaction between the computing system 100 and a user of the computing system 100. As such, the user interface 108 can be or include an input component such as a keyboard, a mouse, a remote controller, a microphone, and/or a touch-sensitive panel. The user interface 108 can also be or include an output component such as a display device (which, for example, can be combined with a touch-sensitive panel) and/or a sound speaker.

The computing system 100 can also include one or more connection mechanisms that connect various components within the computing system 100 and that connect the computing system 100 to other devices. For example, the computing system 100 can include the connection mechanisms represented by lines that connect components of the computing system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more other entities, such as a router, switcher, or other network device. Likewise, in this disclosure, communication (e.g., a transmission or receipt of data) can be a direct or indirect communication.

The computing system 100 can include one or more of the above-described components and can be configured or arranged in various ways. For example, the computing system 100 can be configured as a server and/or a client (or perhaps a cluster of servers and/or a cluster of clients) operating in one or more server-client type arrangements, for instance.

As shown, the computing system 100 can include, or be communicatively coupled to (e.g., via a connection mechanism), one or more sensors 110. The one or more sensors 110 can be or include a camera, and can additionally include one or more microphones, one or more motion sensors (e.g., gyroscope or accelerometer), one or more Wi-Fi modules capable of motion detection, and/or one or more other cameras. The computing system 100 can be configured to receive and process data received from the one or more sensors 110.

In some cases, the computing system 100 can take the form of a controller of a media player configured to provide media content (e.g., video programming, such as streaming video) for display to an end-user in a viewing environment of the media player. The controller can be located in the media player itself—that is, the computing system 100 can be a controller that is onboard the media player (e.g., the media player's local controller, housed within a physical housing of the media player)—or can be located remote from, but communicatively coupled to, the media player.

Herein, a "viewing environment" can refer to an environment, such as a room of a house, within which end-users can view media content that is provided for display by the media player. The media player can be or include a television set, a set-top box, a television set with an integrated set-top box, a video game console, a desktop computer, a laptop computer, a tablet computer, a mobile phone, a home appliance (e.g., a refrigerator), among other possibilities.

III. Example Operations

The computing system 100 and/or components thereof can be configured to perform and/or can perform one or more operations. Examples of these operations and related features will now be described with reference to FIGS. 2, 3, 4, 5, and 6.

Figure 2:
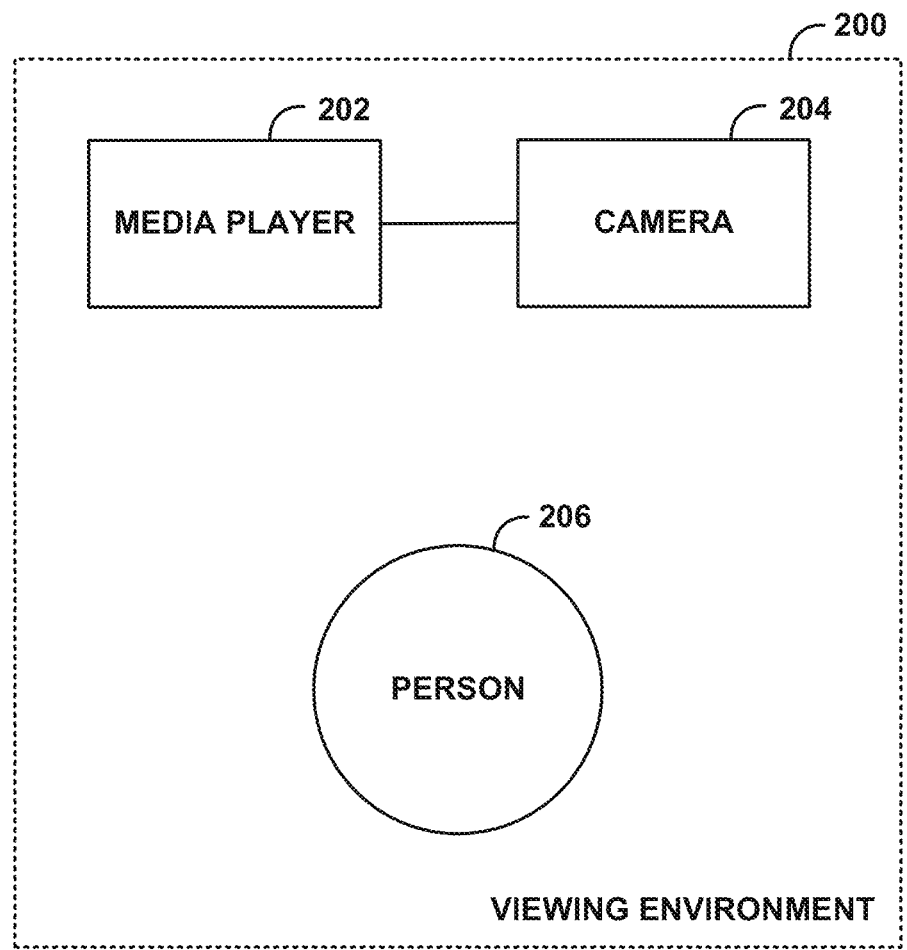
FIG. 2 depicts an example viewing environment of a media player.

FIG. 2 depicts an example viewing environment 200 of a media player 202. The media player 202 can be a computing system such as computing system 100. As such, operations are described as being performed by the media player 202. However, it should be understood that a computing system other than the media player 202 can be configured to perform any one or more of the operations described herein.

As further shown in FIG. 2, a camera 204 can be communicatively coupled to the media player 202 and configured to capture video data of a person 206 (i.e., an end-user) present in the viewing environment 200. Within examples, the camera 204 can be a night vision camera, such as a high-resolution infrared (IR) camera. The camera 204 can take alternative forms as well.

As a general matter, the media player 202 can receive, from one or more sensors (e.g., the one or more sensors 110, which can be or include the camera 204), data that can indicate the presence of one or more persons in the viewing environment 200. For example, the media player 202 can receive one or more images (e.g., still image(s) or a video) captured by the camera 204. Additionally or alternatively, the media player 202 can receive audio data from a microphone (not shown) present in the viewing environment 200, such as audio data representing spoken utterances (e.g., voice commands for controlling the media player 202) from one or more persons in the viewing environment 200.

As will be described in more detail elsewhere herein, when multiple persons are present in the viewing environment 200, the media player 202 can use the received data as a basis for determining which person to monitor for detecting gestures.

Within examples, detecting a gesture performed by a person in the viewing environment 200 can involve person detection operations, followed by gesture recognition operations. Performance of person detection operations can help reduce false positives, and can help focus gesture recognition operations on a smaller, more computationally-feasible region of interest in image(s) captured by the camera 204.

To detect the person 206, the media player 202 can be configured to analyze image(s) captured by the camera 204 for object detection and to use one or more classification models to determine whether objects in the image(s) is/are people. The classification models can be trained to localize a person in an image by predicting a two-dimensional bounding box of the position of the person. To facilitate this, the classification models can be trained using IR images of various viewing environments, such as various living rooms in which end-users watch television. The trained classification models can be configured to classify what is being seen in an image or images as a person.

In response to detecting the person, the media player 202 can monitor, using the camera 204, the viewing environment 200 to detect performance by the person 206 of a gesture. To facilitate this, for example, the media player 202 can store a gesture classification model that classifies an input as one of N possible gesture classifications that the media player 202 has been trained to recognize, where N is greater than one. Example gestures can include thumbs-up, thumbs-down, thumbs-left, thumbs-right, open-hand, hand waving, and/or fingertip movements, among other possibilities. In some cases, the output of gesture detection for a given frame captured by the camera 204 can be or include a bounding box labeled with the detected gesture (also referred to as a "class" in practice), as well as bounding box coordinates (e.g., (x,y,w,h), where x and y represent the coordinates, using the upper left corner as a starting point, and w and h are the width and height of the bounding box, respectively).

Within examples, false positives can be further reduced by training sequence models, such as a transformer, on small windows of time, where an example input to the sequence model can be an output of gesture detection, waiting for N detections to confirm a recognize gesture, where N is greater than one.

The person detection and gesture recognition operations can take other forms as well, additionally or alternatively to the operations described above. While performing person detection before gesture recognition can be computationally efficient, gesture recognition can be performed without priori person information in some embodiments. Furthermore, person detection and/or gesture recognition can be performed locally at the media player 202 such that the images captured by the camera 204 are not sent to a server or other computing system.

Figure 3:
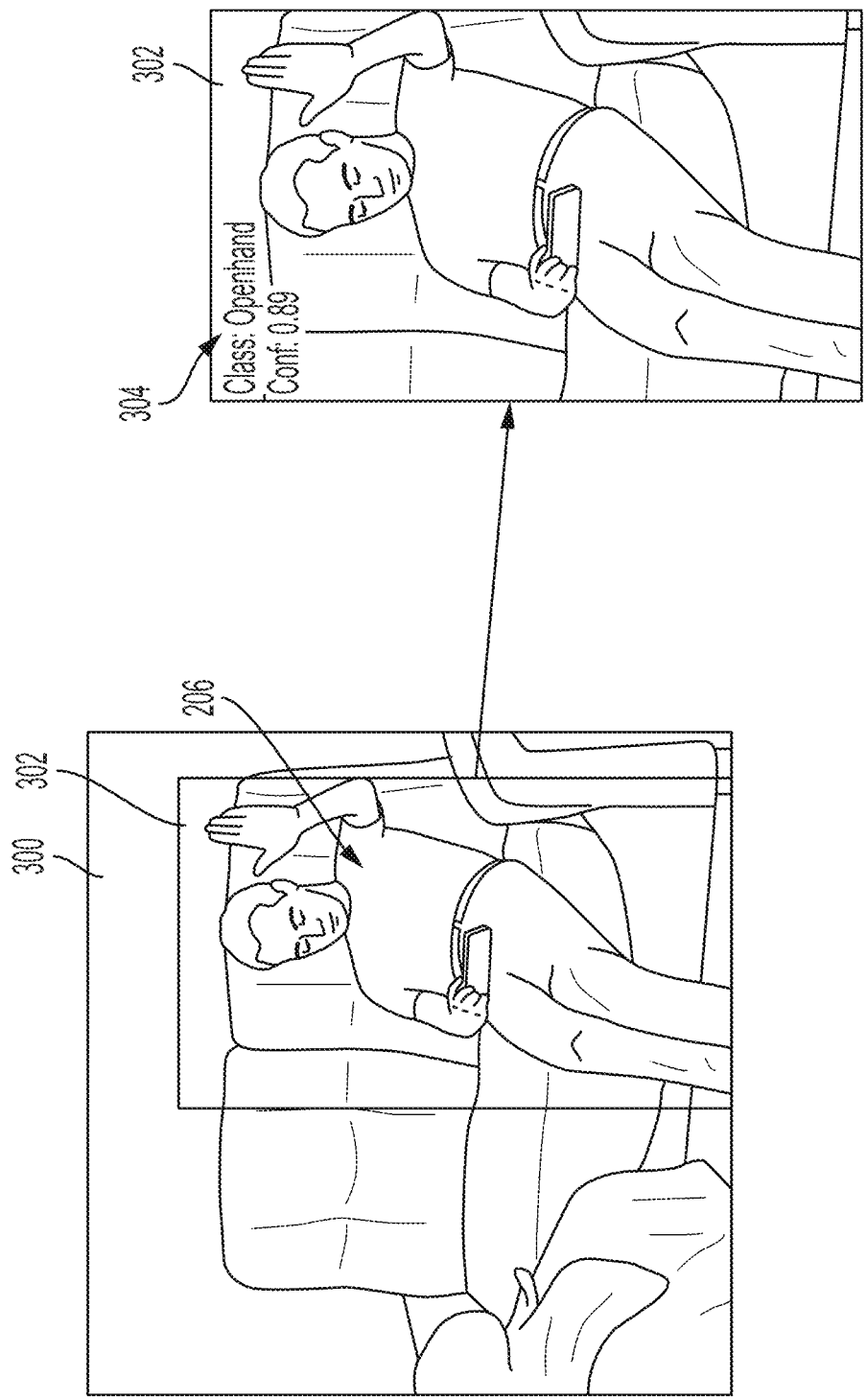
FIG. 3 depicts an example image, a bounding box identifying a predicted position of a person within the image, and a classification of a gesture performed by the person.

FIG. 3 depicts an example image 300 and bounding box 302, where the bounding box 302 identifies the predicted position of the person 206 within the image 300. In the image 300, the person 206 is performing an open hand gesture, which a gesture classification model can be configured to recognize, as shown in text 304 accompanying the bounding box 302.

Upon detecting the gesture, the media player 202 can correlate the detected gesture with a corresponding action of a plurality of actions that the media player 202 is configured to perform, and then perform the corresponding action.

The plurality of actions can be different for each type of media player. For a set-top box, for instance, the plurality of actions can include actions such as pausing video being presented for display by the media player, rewinding video, fast forwarding video, stopping video playback, navigating pages or icons displayed in a user interface menu, and/or selecting a video to watch from a user interface menu, among other possibilities. As a specific example of a type of gesture that can be correlated to a type of action, the gesture can be the person 206 picking up a phone and the corresponding action can be pausing video being presented for display by the media player 202.

In embodiments where the computing system that is performing the described operations is not the media player 202 itself, the computing system can control the media player 202 to perform the corresponding action, such as by transmitting instructions to the media player 202 to perform the corresponding action.

As an example of correlating the detected gesture with the corresponding action, the media player 202 can compare the detected gesture with a library of known gestures, which can be stored in local memory (e.g., data storage unit 104) or remote memory and can be accessed by the media player 202. The library of known gestures can include mapping data that correlates each gesture of the library with a respective one of the plurality of actions that the media player 202 is configured to perform. If the media player 202 determines that the detected gesture has at least a threshold degree of similarity to a particular gesture of the library, the media player 202 can responsively select, from the library, the action that the mapping data maps to that particular gesture. Furthermore, in some embodiments, the media player 202 can also store an exclusion list for one or more gestures that the media player 202 can recognize, but to which the media player 202 should not respond.

In some embodiments, the person detection and/or gesture recognition operations that the media player 202 is configured to perform can be passively running, but the media player 202 might be configured such that, in the passive mode, the media player 202 will not respond to any detected gestures except a particular wake gesture. In other words, the media player 202 can be configured operated by default in a first mode of operation in which the media player 202, via the camera 204 is monitoring the viewing environment 200 and, in response to detecting performance of the particular wake gesture (e.g., a thumbs-up), the media player 202 can switch from operating in the first mode to instead operate in a second mode of operation in which the media player 202 is configured to perform any one of the plurality of actions in response to detecting a corresponding gesture. Thus, for the purposes of the above-described example, the plurality of actions excludes the action of switching from the first mode to the second mode. Similarly, the media player 202 can also be configured such that, while operating in the second mode, the media player 202 can detect a particular sleep gesture (e.g., a thumbs-down) and responsively switch from operating in the second mode back to operating in the first mode.

More specific gesture control operations will now be described in more detail.

A. Operations Related to Customized Gesture Detection

In operation, the media player 202 can receive, from an input device associated with the computing system 100 (e.g., a remote control for the media player 202), a command to map a customized gesture with a particular action of the plurality of actions. For example, the person 206 can use push buttons on a remote control for the media player 202 to select, on a displayed user interface, a function to initiate a process for creating a customized gesture and mapping them to one of the plurality of actions. As another example, the person 206 can provide a voice command that is detected by a microphone on the remote control or a microphone of another input device (e.g., another device in the viewing environment 200, such as a smart speaker).

In response to receiving the command, the media player 202 monitors, using the camera 204, the viewing environment 200 to detect performance by the person 206 of the customized gesture.

In response to detecting performance of the customized gesture, the media player 202 can perform various operations. For example, the media player 202 can determine whether any of the known gestures in the library are similar to the customized gesture within a threshold degree of similarity and provide for display a suggested gesture from the library along with a notification to the person 206 (e.g., "Did you mean to perform this gesture?" or "Here is a suggested gesture for you.").

Assuming that the media player 202 does not recognize the customized gesture, the media player 202 can respond to detecting performance of the customized gesture to generate a new classification for the customized gesture for use by the gesture classification model, and then store, in memory (e.g., data storage unit 104), such as in the library, mapping data that correlates the detected customized gesture with the particular action. To generate the classification, the media player 202 can require the person 206 to repeat the customized gesture a predefined number of times or until the media player 202 has enough data to recognize the customized gesture and generate the classification. In situations where the person 206 has not specified an action to correlate to the customized gesture, the media player 202 can prompt the person 206 (e.g., by displaying a message) to select which of the plurality of actions to correlate to the customized gesture.

Within examples, after the customized gesture is repeated the predefined number of times, the media player 202 can be configured to determine if each performance of the customized gesture has (i) a threshold degree of similarity to the others and (ii) a threshold degree of dissimilarity from existing gestures for which classifications already exist. In response to both such conditions being met, the customized gesture can be added and the classification can be created. If one or both conditions are not met, the media player 202 can provide feedback to the person 206, such as asking the person 206 to perform the customized gesture again a certain number of times.

Once the customized gesture is added to the library, the media player 202 can detect and respond to the customized gesture in the manner described above.

In some embodiments, when the person 206 sets up the media player 202 for the first time, or sets up another computing system associated with the media player 202 for the first time, the media player 202 or other computing system can be configured to prompt the person 206 to select which known gestures to map to which actions and/or to create new gestures for the media system 202 or other computing system to recognize and map to the actions. At this time during the initial set up, or at a later time, the person 206 can create a gesture profile that includes user-specified mapping data that correlates each gesture of the library to a respective one of the plurality of actions. Thus, in response to the person 206 being recognized, the media system 202 can (i) load, from memory, the gesture profile associated with the person 206 and (ii) monitor the viewing environment 200 to detect performance by the person 206 of the gesture, in which case the media system 202 can correlate the gesture and perform the appropriate action, as described above.

In some situations, the media player 202 can calculate an uncertainty value when recognizing a particular gesture. In some embodiments, when the media player 202 is monitoring the viewing environment 200 and detects that the person 206 has performed a gesture that is within a threshold degree of similarity to a particular gesture of the library of gestures and has an uncertainty value that meets or exceeds a particular threshold, the media player 202 can responsively prompt the person 206 to confirm whether the person 206 intended to perform the particular gesture or rather a different gesture. If the person 206 indicates that the intent was to perform a different gesture, the media player 202 might also prompt the user B. Operations Related to Detecting a Person to Monitor for Gestures In some cases, the media player 202 can be configured to selectively recognize gestures. For instance, the media player 202 can recognize and have gesture profiles for multiple different persons, and can include one or more classifiers that are used to identify a particular person based on various factors, such as walking pattern, gait, and size, among other possibilities. The media player 202 can also be configured to ignore gestures made by persons that meet certain criteria (e.g., the walking pattern, gait, and size of a child).

It can be desirable in some situations, such as when multiple persons are present in the viewing environment 200, for the media player 202 to know which person (or persons) of a group of multiple persons to monitor for gesture controls.

Thus, the media player 202 can detect that there are multiple persons within one or more images of the viewing environment 200 and, based on data received from the one or more sensors in the viewing environment 200 (e.g., the camera 204, a microphone, and/or other sensors), select, from the multiple detected persons, a particular person to monitor for gestures.

In particular, the media player 202 can be configured to detect a specific person in the viewing environment 200 as a controller of the media player 202 based on that person performing a specific gesture and/or providing other recognizable inputs. In some cases, the person who performs the wake gesture described above can be that person. Additionally or alternatively, other data can be used. For example, the data received from the one or more sensors can represent (i) a wake word uttered by the particular person, (ii) a facial recognition of the particular person, (iii) a wake gesture performed by the particular person, (iv) a detection that the particular person is holding a remote control for the media player 202, and/or (v) a scan of a QR code presented by a display device within the viewing environment 200, among other possibilities. As a more specific example, the media player 202 can be configured to use a multimodal input, such as requiring the particular person to utter a specific wake word while performing a specific wake gesture.

Moreover, in some cases, any two or more of the inputs listed above can be used for two-factor (or more factors) authorization for a particular person to control the media player 202, change its settings, etc. As a specific example, the media player 202 can prompt the person 206 to hold up a QR code on their smartphone for the camera 204 to scan, followed by a prompt to perform a specific gesture.

C. Operations Related to Using a Camera Outside of the Viewing Environment to Control Operations in the Viewing Environment The media player 202 can also be configured to use images captured by the camera 204 in the viewing environment 200 to train itself to be able to recognize gestures in images captured by cameras outside of the viewing environment 200. That way, the person 206 can control operations of the media player 202 without being physically present in the viewing environment 200 and in the field of view of the camera 204. For example, the person 206 can perform a wake gesture as they enter their house in order to turn on the media player 202 or pull up a particular user interface menu before the person 206 enters the viewing environment 200, thus providing an efficient improvement to user experience.

Figure 4:
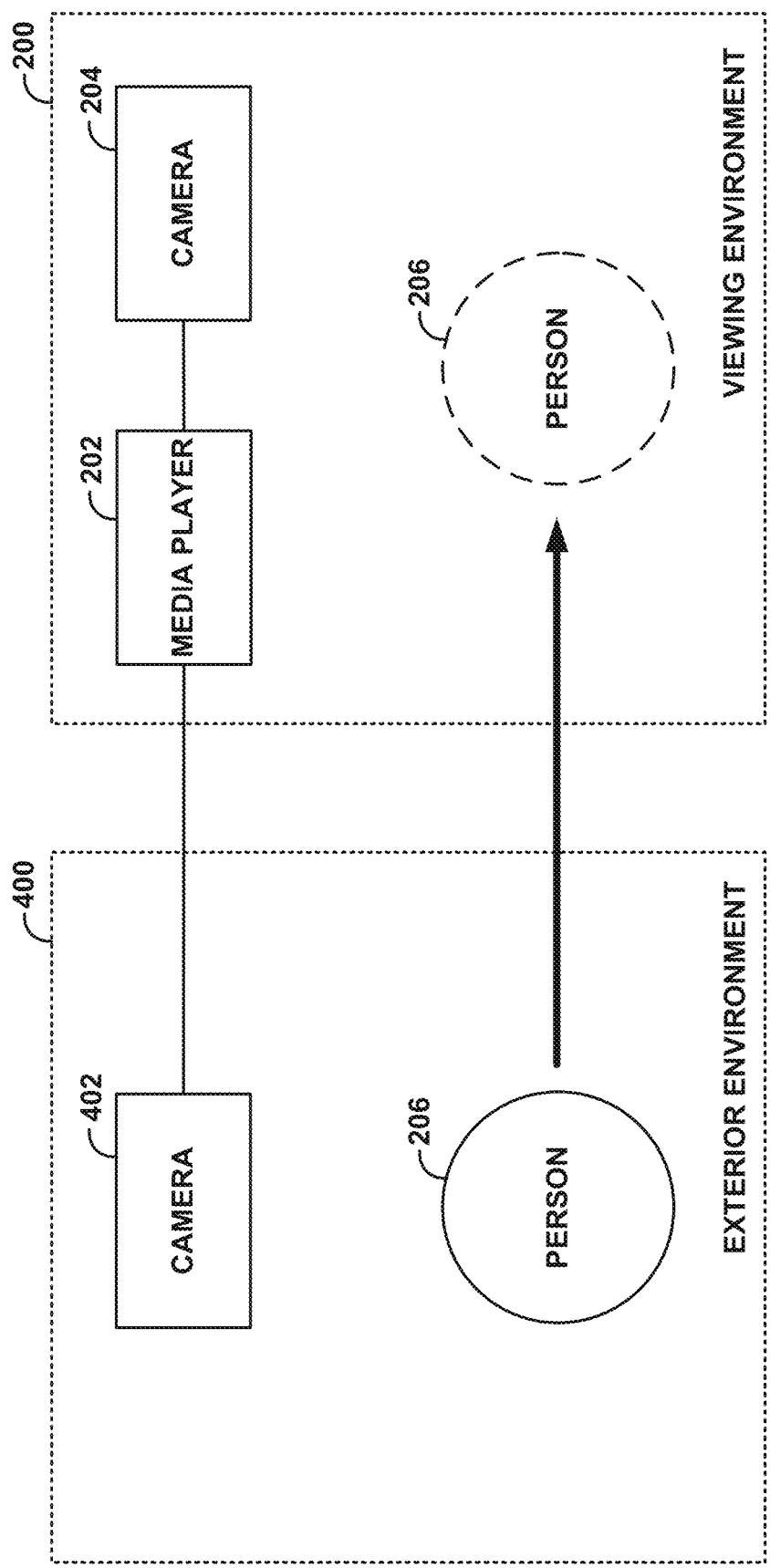
FIG. 4 depicts an example viewing environment of a media player and an example exterior environment.

FIG. 4 depicts the viewing environment 200 of the media player 202 in which the camera 204 is located and also depicts an exterior environment 400 in which a second camera 402 is located. The exterior environment 400 can be an environment that is different from the viewing environment 200. For example, if the viewing environment 200 is a room in a house, the exterior environment 400 can be an adjacent room or a location outside of the house, such as a front porch. As a more specific example, the camera 204 can be mounted to a television in the viewing environment 200 and the second camera 402 can be mounted to a ceiling or doorframe on a front porch of a house.

As so arranged, the media player 202 can determine training data (e.g., one or more images) of the person 206 within the viewing environment 200 performing a particular gesture (e.g., a known gesture, or a new gesture as part of the customized gesture process described above). In some cases, the training data of the person 206 might already be stored in memory, in which case the media player 202 can retrieve the training data from memory. In other cases, the media player 202 can control the camera 204 to capture the training data.

The media player 202 can also determine pose data that specifies a known orientation and/or a known position of the camera 204 relative to a reference coordinate system such as a global reference frame. For example, to determine the pose data, the media player 202 can cause a display device (e.g., the television screen in situations where the media player 202 is or is coupled to a television, or another computing device such as a person's smartphone) to display a fiducial that can be observed by camera 204. By having the camera 204 observe the fiducial, the media player 202 can receive sufficient information to determine the relative degrees of freedom of the camera 204 with respect to the media player 202 or another reference point. Further, in some cases, the pose data that is determined can also specify a known orientation and/or a known position of the second camera 402, and this orientation/position can be determined in a similar way as described above. For example, the second camera 402 can observe a fiducial present in the exterior environment 400 and the media player 202 can determine the relative degrees of freedom of the second camera 402 with respect to a reference point.

Based on the training data and the pose data, the media player 202 can generate a classification for detecting the particular gesture using the second camera 402. Thereafter, the media player 202 can monitor the exterior environment 400 using the second camera 402 to detect the particular gesture. Upon detection of the particular gesture, the media player 202 can correlate that gesture and perform a corresponding action, as described above.

As shown in FIG. 4, for example, the person 206 can perform the gesture to camera 402 in exterior environment 400 to control the media player 202, and then enter the viewing environment 200 to view what is being presented by the media player 202.

D. Example Methods

Figure 5:
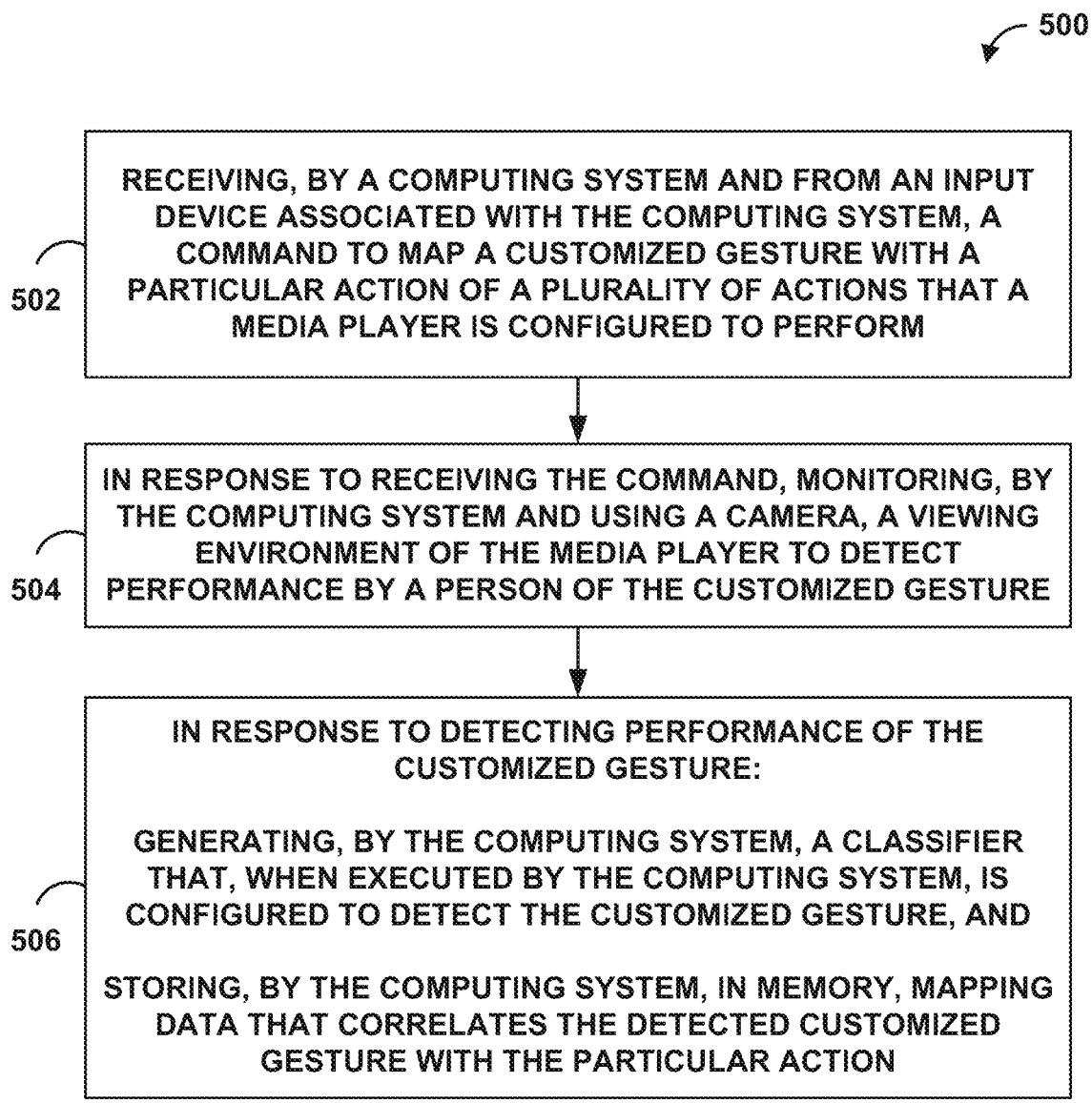
FIG. 5 is a flow chart of an example method.

FIG. 5 is a flow chart illustrating an example method 500. The method 500 can be carried out by the computing system 100. At block 502, the method 500 includes receiving, by a computing system and from an input device associated with the computing system, a command to map a customized gesture with a particular action of a plurality of actions that a media player is configured to perform. At block 504, the method 500 includes in response to receiving the command, monitoring, by the computing system and using a camera, a viewing environment of the media player to detect performance by a person of the customized gesture. At block 506, the method 500 includes in response to detecting performance of the customized gesture: generating, by the computing system, a classification for use by the computing system for detecting the customized gesture, and storing, by the computing system, in memory, mapping data that correlates the detected customized gesture with the particular action.

Figure 6:
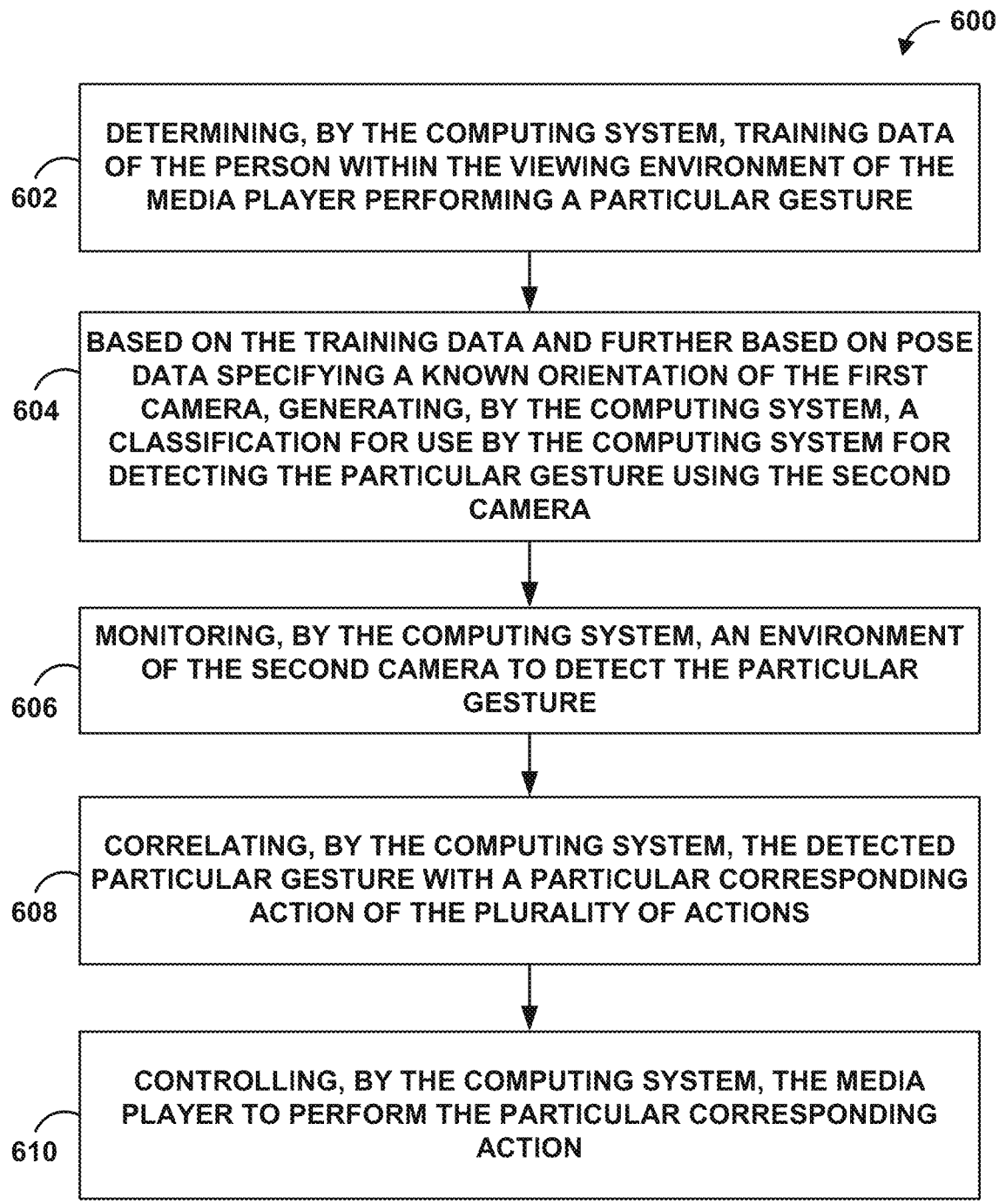
FIG. 6 is a flow chart of another example method.

FIG. 6 is a flow chart illustrating another example method 600. In some implementations, the method 600 can be performed in addition to method 500, particularly where the camera is a first camera that is mounted at a first location within the viewing environment of the media player, and where a second camera is mounted at a second location different from the first location and exterior to the viewing environment of the media player. The method 600 can be carried out by the computing system 100.

At block 602, the method 600 includes determining, by the computing system, training data of the person within the viewing environment of the media player performing a particular gesture. At block 604, the method 600 includes based on the training data and further based on pose data specifying a known orientation of the first camera, generating, by the computing system, a classification for use by the computing system for detecting the particular gesture using the second camera. At block 606, the method 600 includes monitoring, by the computing system, an environment of the second camera to detect the particular gesture. At block 608, the method 600 includes correlating, by the computing system, the detected particular gesture with a particular corresponding action of the plurality of actions. At block 610, the method 600 includes controlling, by the computing system, the media player to perform the particular corresponding action.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A computing system configured for performing a set of acts comprising:
   receiving, from an input device associated with the computing system, a command to map a customized gesture with a particular action of a plurality of actions that a media player is configured to perform;
   in response to receiving the command, monitoring, using a camera, a viewing environment of the media player to detect performance by a person of the customized gesture;
   in response to detecting performance of the customized gesture:
   (i) generating a classification for use by the computing system for detecting the customized gesture, and
   (ii) storing, in memory, mapping data that correlates the detected customized gesture with the particular action;
   detecting the person within one or more images of the viewing environment captured by the camera;
   in response to detecting the person, monitoring, using the camera, the viewing environment to detect performance by the person of a gesture;
   correlating the detected gesture with a corresponding action of a plurality of actions that the media player is configured to perform, wherein the correlating the detected gesture with the corresponding action of the plurality of actions that the media player is configured to perform comprises:
   (i) comparing the detected gesture with a library of known gestures,
   (ii) determining that the detected gesture has at least a threshold degree of similarity to a particular gesture of the library of known gestures, and
   (iii) in response to determining that the detected gesture has at least the threshold degree of similarity to the particular gesture of the library of known gestures, selecting the corresponding action based on mapping data that correlates each gesture of the library of known gestures to a respective one of the plurality of actions; and
   controlling the media player to perform the corresponding action.

2. The computing system of claim 1, wherein:
   the detected gesture is the customized gesture, and
   the corresponding action is the particular action that the mapping data correlates with the customized gesture.

3. The computing system of claim 1, wherein:
   the gesture comprises the person picking up a phone, and
   the corresponding action comprises pausing media content being presented for display by the media player.

4. The computing system of claim 1, the set of acts further comprising:
   detecting multiple persons within one or more images of the viewing environment; and
   based on data received from one or more sensors in the viewing environment, selecting, from the multiple detected persons, a particular person to monitor for gestures.

5. The computing system of claim 4, wherein:
   the data received from the one or more sensors represents at least one of (i) a wake word uttered by the particular person, (ii) a facial recognition of the particular person, (iii) a wake gesture performed by the particular person, (iv) a detection that the particular person is holding a remote control for the media player, or (v) a scan of a QR code presented by a display device within the viewing environment.

6. The computing system of claim 1, wherein:
   the camera is a first camera,
   the first camera is mounted at a first location within the viewing environment of the media player,
   a second camera is mounted at a second location different from the first location and exterior to the viewing environment of the media player, and
   the set of acts further comprise:
   determining training data of the person within the viewing environment of the media player performing a particular gesture;
   based on the training data and further based on pose data specifying a known orientation of the first camera, generating a classification for use by the computing system for detecting the particular gesture using the second camera;
   monitoring an environment of the second camera to detect the particular gesture;
   correlating the detected particular gesture with a particular corresponding action of the plurality of actions; and
   controlling the media player to perform the particular corresponding action.

7. The computing system of claim 1, the set of acts further comprising:
   based on data received from one or more sensors in the viewing environment, detecting the person within one or more images of the viewing environment captured by the camera of the one or more sensors;
   in response to detecting the person:
   loading, from memory, a gesture profile associated with the detected person, wherein the gesture profile comprises user-specified mapping data that correlates each gesture of a library of gestures to a respective one of the plurality of actions, and
   monitoring, using the camera, the viewing environment to detect performance by the person of a gesture;
   correlating the detected gesture to a particular action of the plurality of actions that the mapping data of the gesture profile correlates to the detected gesture; and
   controlling the media player to perform the particular action.

8. The computing system of claim 1, wherein the computing system is a controller onboard the media player.

9. The computing system of claim 1, wherein the camera is a night vision camera.

10. A method comprising:
    receiving, by a computing system and from an input device associated with the computing system, a command to map a customized gesture with a particular action of a plurality of actions that a media player is configured to perform;

in response to receiving the command, monitoring, by the computing system and using a camera, a viewing environment of the media player to detect performance by a person of the customized gesture;
in response to detecting performance of the customized gesture:
  (i) generating, by the computing system, a classification for use by the computing system for detecting the customized gesture, and
  (ii) storing, by the computing system, in memory, mapping data that correlates the detected customized gesture with the particular action;
detecting the person within one or more images of the viewing environment captured by the camera;
in response to detecting the person, monitoring, using the camera, the viewing environment to detect performance by the person of a gesture;
correlating the detected gesture with a corresponding action of a plurality of actions that the media player is configured to perform, wherein the correlating the detected gesture with the corresponding action of the plurality of actions that the media player is configured to perform comprises:
  (i) comparing the detected gesture with a library of known gestures,
  (ii) determining that the detected gesture has at least a threshold degree of similarity to a particular gesture of the library of known gestures, and
  (iii) in response to determining that the detected gesture has at least the threshold degree of similarity to the particular gesture of the library of known gestures, selecting the corresponding action based on mapping data that correlates each gesture of the library of known gestures to a respective one of the plurality of actions; and
  controlling the media player to perform the corresponding action.

11. The method of claim 10, wherein:
the detected gesture is the customized gesture, and
the corresponding action is the particular action that the mapping data correlates with the customized gesture.

12. The method of claim 10, further comprising:
detecting, by the computing system, multiple persons within one or more images of the viewing environment; and
based on data received from one or more sensors in the viewing environment, selecting, by the computing system and from the multiple detected persons, a particular person to monitor for gestures.

13. The method of claim 12, wherein:
the data received from the one or more sensors represents at least one of (i) a wake word uttered by the particular person, (ii) a facial recognition of the particular person, (iii) a wake gesture performed by the particular person, (iv) a detection that the particular person is holding a remote control for the media player, or (v) a scan of a QR code presented by a display device within the viewing environment.

14. The method of claim 10, wherein:
the camera is a first camera,
the first camera is mounted at a first location within the viewing environment of the media player,
a second camera is mounted at a second location different from the first location and exterior to the viewing environment of the media player, and
the method further comprises:

determining, by the computing system, training data of the person within the viewing environment of the media player performing a particular gesture;
based on the training data and further based on pose data specifying a known orientation of the first camera, generating, by the computing system, a classification for use by the computing system for detecting the particular gesture using the second camera;
monitoring, by the computing system, an environment of the second camera to detect the particular gesture;
correlating, by the computing system, the detected particular gesture with a particular corresponding action of the plurality of actions; and
controlling, by the computing system, the media player to perform the particular corresponding action.

15. The method of claim 10, further comprising:
based on data received from one or more sensors in the viewing environment, detecting, by the computing system, the person within one or more images of the viewing environment captured by the camera of the one or more sensors;
in response to detecting the person:
  loading, by the computing system, from memory, a gesture profile associated with the detected person, wherein the gesture profile comprises user-specified mapping data that correlates each gesture of a library of gestures to a respective one of the plurality of actions, and
  monitoring, by the computing system and using the camera, the viewing environment to detect performance by the person of a gesture;
correlating, by the computing system, the detected gesture to a particular action of the plurality of actions that the mapping data of the gesture profile correlates to the detected gesture; and
controlling, by the computing system, the media player to perform the corresponding action.

16. The method of claim 10, wherein the computing system is a controller onboard the media player.

17. A non-transitory computer-readable medium having stored thereon program instructions that upon execution by a computing system, cause performance of a set of acts comprising:
receiving, from an input device associated with the computing system, a command to map a customized gesture with a particular action of a plurality of actions that a media player is configured to perform;
in response to receiving the command, monitoring, using a camera, a viewing environment of the media player to detect performance by a person of the customized gesture;
in response to detecting performance of the customized gesture:
  (i) generating a classification for use by the computing system for detecting the customized gesture, and
  (ii) storing, in memory, mapping data that correlates the detected customized gesture with the particular action;
detecting the person within one or more images of the viewing environment captured by the camera;
in response to detecting the person, monitoring, using the camera, the viewing environment to detect performance by the person of a gesture;
correlating the detected gesture with a corresponding action of a plurality of actions that the media player is configured to perform, wherein the correlating the detected gesture with the corresponding action of the plurality of actions that the media player is configured to perform comprises:

(i) comparing the detected gesture with a library of known gestures, (ii) determining that the detected gesture has at least a threshold degree of similarity to a particular gesture of the library of known gestures, and (iii) in response to determining that the detected gesture has at least the threshold degree of similarity to the particular gesture of the library of known gestures, selecting the corresponding action based on mapping data that correlates each gesture of the library of known gestures to a respective one of the plurality of actions; and controlling the media player to perform the corresponding action.

\* \* \* \* \*